G. LITTLE.

Printing Telegraphs.

No. 5,267. Reissued Feb. 4, 1873.

Witnesses.

Chas H Smith
Harold Serrell

Inventor.

George Little

THE NORRIS PETERS CO., PHOTO-LITHO., WASHINGTON, D. C.

UNITED STATES PATENT OFFICE.

GEORGE LITTLE, OF RUTHERFORD PARK, NEW JERSEY.

IMPROVEMENT IN PRINTING-TELEGRAPHS.

Specification forming part of Letters Patent No. 125,583, dated April 9, 1872; reissue No. 5,267, dated February 4, 1873.

*To all whom it may concern:*

Be it known that I, GEORGE LITTLE, of Rutherford Park, in the county of Bergen and State of New Jersey, have invented and made a new and useful Improvement in Printing-Telegraphs; and I do hereby declare the following to be a correct description of the same.

The type-wheel is upon an axis that is provided with a radially-swinging armature, acting in connection with an electro-magnet to give a progressive movement to the type-wheel. The type-wheel is of iron, polarized, preferably, by a helix surrounding the shaft. The impression-roller is hung upon a vibrating electro-magnet connected with a local battery. The polarity of the type-wheel is such as to repel the pole of the electro-magnet carrying the impression-roller and attract the other pole toward said type-wheel; but contact is prevented by a stop. When the type-wheel has been moved around to the desired point the impression is made by reversing the main current, which changes the polarity of the type-wheel simultaneously with the movement of the same. This causes the impression-roller to swing into contact with the type-wheel and print the letter, and at the same time serrations on the edges of the type-wheel move the paper along.

Figure 1:
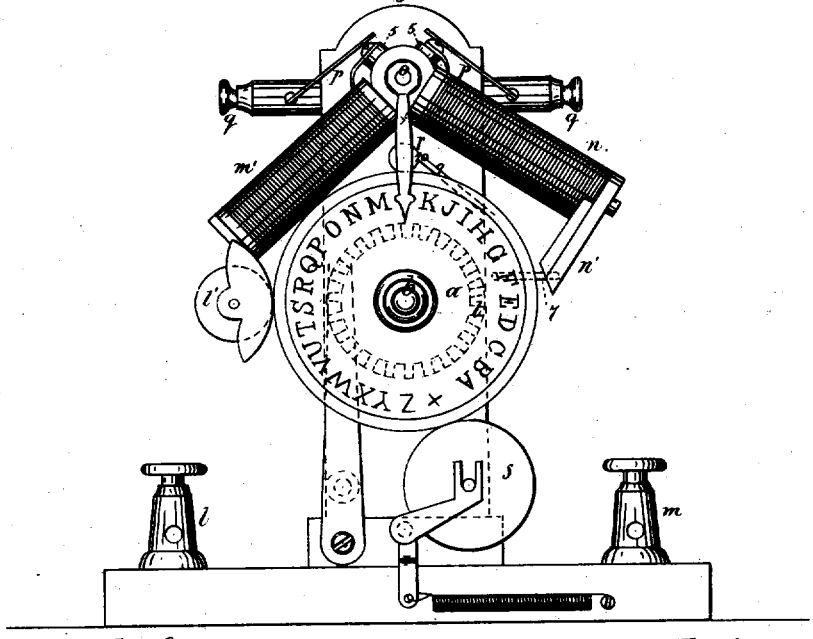
Figure 2:
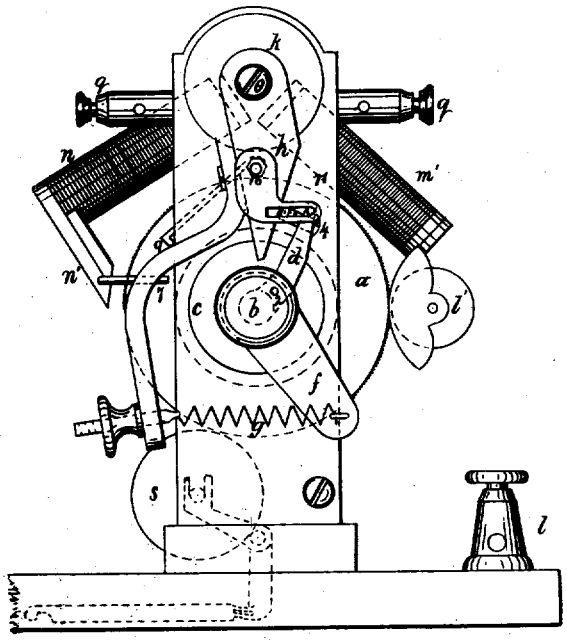
Figure 3:
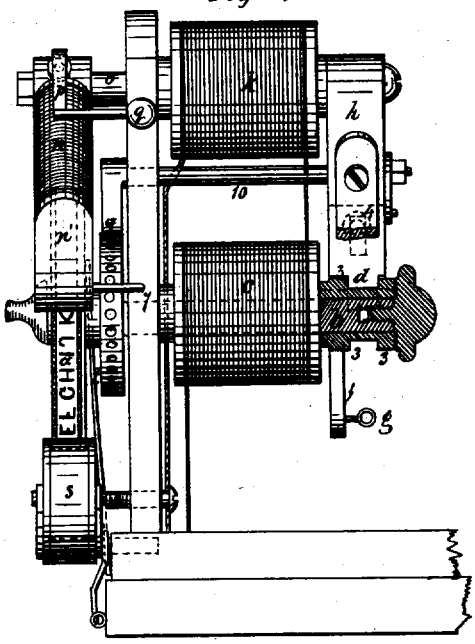

In the drawing, Figure 1 is an elevation of my said apparatus. Fig. 2 is an elevation of the reverse side of said apparatus, and Fig. 3 is a view at right angles to Fig. 1.

The type-wheel *a* is upon an arbor, *b*, that carries an armature, *d*, operated upon by the pole *h* of an electro-magnet; and this armature swings radially to communicate to the type-wheel a progressive movement. This armature *d* is represented as part of a friction-clamp secured between the heads 3 by a pin, 2, and these heads 3 are part of the lever *f*; and *g* is the return-spring. As the armature *d* is attracted by the electro-magnet and swings with and upon the type-wheel shaft to give to the same a progressive movement the end of the armature acts as a clamp in a manner similar to that of a sewing-machine feed, the motion being adjusted by the screw 4 extending from the pole *h* of the magnet helix or coil *k*. The coils *c* and *k* are connected with the binding-screws *l m* that are placed in the main line or circuit, and the pulsations are derived from finger-keys arranged to connect or close the circuit in one direction through the coils *c* and *k* for setting the type-wheel *a* by the pole *h* attracting the armature *d*, and, at the same time, the type-wheel becomes polarized by induced magnetism from the helix *c*. When the other finger-key is struck the direction of the current is reversed to change the polarity of the type-wheel for the purpose of causing the impression and feeding the paper by the movement of the type-wheel, said type-wheel having serrated edges that act upon the paper between the periphery of said type-wheel and the impression-roller *l'*. This impression-roller *l'* is upon the end of the arm *m'*; and *n* is a second arm connected to *m'*, and the two swing upon the stud *o*. Around these arms *m' n* coils or helices are wound; and the wires are connected, by the insulated pins 5 and springs *p*, to the binding-screws *q* of a local circuit. The wires are connected so that the armature *n'* of the arm *n* is attracted by the polarity of the type-wheel *a*; but a stop, 7, limits the movement, so that the parts do not touch. When the polarity of *a* is reversed in effecting the last movement in setting the type-wheel the armature *n'* is repelled and the roller *l'* brought into contact with the type-wheel to print the letter and feed the paper, the rolling motion given to the type-wheel when in contact with *l'* effecting these operations. An inking-roller, *s*, is provided; and I also make use of a dial upon the side of the type-wheel *a*, having letters or characters corresponding to those upon the type-wheel, and placed so that when the desired letter is indicated by the pointer *r* the corresponding letter will be in position for printing. This enables an operator to set his own machine and print a copy of the message sent to the distant station. In order to hold the type-wheel each successive pulsation I employ the perforated ratchet-wheel *t* receiving the conical point 9 of a spring-lever. I have shown the said point 9 and lever upon a rock-shaft, 10, operated by the crank-pin 11 on the clamp *d* and its return-spring *g*.

The type-wheel might be made of steel permanently magnetized, and the impression be made by reversing the polarity of the contiguous electro-magnet.

I claim as my invention—

1. An iron type-wheel, polarized by induction, in combination with a magnet, to effect the impression when the polarity of the type-wheel is changed, substantially as set forth.

2. The type-wheel upon an arbor running through a coil, and provided with a swinging armature-clamp to move the type-wheel, in combination with an electro-magnet for said armature, substantially as set forth.

3. The electro-magnet $m'$ $n$ set to swing and carry the armature $n'$ and impression-roller $l'$, in combination with the type-wheel, as and for the purposes specified.

4. A magnetized type-wheel, in combination with the swinging electro-magnet, to effect the impression and feed of the paper when the polarity is reversed, substantially as specified.

5. Two or more magnetized type-wheels in one electric circuit, and revolving in unison by pulsations from the transmitting instrument, substantially as specified.

6. A radially-swinging armature upon the type-wheel shaft, in combination with a type-wheel and an electro-magnet, whereby said type-wheel is moved around progressively by the direct action of the armature upon the shaft, substantially as set forth.

Signed by me this 19th day of November, A. D. 1872.

GEORGE LITTLE.

Witnesses:
GEO. T. PINCKNEY,
CHAS. H. SMITH.